United States Patent
Dahill

[11] Patent Number: 5,762,210
[45] Date of Patent: Jun. 9, 1998

[54] WHEELBARROW HANGING RACK

[76] Inventor: Henry W. Dahill, 2378 NW. McDougal Ct., Prineville, Oreg. 97754-9302

[21] Appl. No.: 763,749

[22] Filed: Dec. 11, 1996

[51] Int. Cl.$^6$ ............................................. A47F 1/04
[52] U.S. Cl. ................................. 211/60.1; 211/88
[58] Field of Search ......................... 211/18, 60.1, 70, 211/70.6, 87, 88, 89, 99, 100; 248/201, 202.1

[56] References Cited

U.S. PATENT DOCUMENTS

| | | |
|---|---|---|
| 1,636,608 | 7/1927 | KLenyon, Sr. et al. ............... 211/60.1 |
| 2,200,411 | 5/1940 | Boye ................................. 211/100 |
| 2,829,855 | 4/1958 | Gibson ............................... 211/87 |
| 3,915,308 | 10/1975 | Ratzloff et al. . |
| 3,950,004 | 4/1976 | Olsson . |
| 4,269,096 | 5/1981 | Boone . |
| 4,467,925 | 8/1984 | Ratzloff et al. . |
| 5,236,111 | 8/1993 | Ferguson . |
| 5,335,799 | 8/1994 | Coudron .......................... 211/87 |

*Primary Examiner*—Peter M. Cuomo
*Assistant Examiner*—Geraid A. Anderson
*Attorney, Agent, or Firm*—Chase & Yakimo

[57] ABSTRACT

A storage rack for a wheelbarrow includes a lower hook attached to a wall, the hook being configured to receive a portion of a forward lip of the wheelbarrow pan therein. A bar assembly is mounted above the hook and includes a U-shaped bar swingable between a first position with the bar adjacent the wall and a second position displaced from the wall. Upon the user rolling the wheelbarrow to the wall, the forward lip of the wheelbarrow pan is placed in the hook. Upon swinging the handles toward the wall the hook presents a pivot point for the wheelbarrow and supports the weight of the wheelbarrow. Upon the handles being placed adjacent the wall the bar is swung to its second position such that it bears against the handles. The bar precludes the handles from swinging away from the wall so as to maintain the wheelbarrow in a vertical position, the weight of the wheelbarrow being borne by the lower hook.

15 Claims, 5 Drawing Sheets

WHEELBARROW HANGING RACK

BACKGROUND OF THE INVENTION

This invention relates to a storage rack for a wheelbarrow and, more particularly, to a storage rack which effectively positions a wheelbarrow between a ground position and an upright position adjacent a vertical wall or the like.

A wheelbarrow presents storage problems to the user due to its shape and weight. As a ground-adjacent wheelbarrow takes up floor space inside a garage or storage shed, it is desirable to support the wheelbarrow adjacent a vertical surface so as to decrease the amount of floor space taken. Although the cited references disclose various forms of wheelbarrow storage racks, these devices do not assist the user in positioning the wheelbarrow between a ground-adjacent horizontal position and a vertical rack position and subsequently maintaining the vertical wheelbarrow in such rack storage position.

In response thereto I have invented a wheelbarrow storage rack having a first lower wall-mounted plate which engages the front lip of the wheelbarrow pan and an upper swingable, wall-mounted bar for maintaining the handles of the wheelbarrow adjacent the wall. Upon placement of the lip of the wheelbarrow on the lower plate, the wheelbarrow is rotated about the lower lip to a position such that the handles are adjacent the wall surface. A handle on the swingable bar is then grasped so as to rotate the bar to a position bearing against the wheelbarrow handles. The bar thus prevents the wheelbarrow from swinging away from the wall. The above structure allows a user to easily swing a ground-adjacent wheelbarrow from a ground-adjacent position to a vertical storage position for maintenance thereat.

It is therefore a general object of this invention to provide a storage rack for a wheelbarrow which allows the wheelbarrow to be stored and maintained at an upright position adjacent a vertical wall.

A further object of this invention is to provide a rack, as aforesaid, the rack comprising a lower plate for engaging a lip of a wheelbarrow and an upper bar for engaging the handles of the wheelbarrow.

Another object of this invention is to provide a device, as aforesaid, the upper bar being rotatable between a handle release and handle locking positions.

A further object of this invention is to provide a rack, as aforesaid, the bar having a handle for moving the bar between its release and locking positions.

Another particular object of this invention is to provide a rack with lower plate, as aforesaid, the lower plate providing a pivot point for the wheelbarrow lip engaged therein.

Other objects and advantages of this invention will become apparent from the following description taken in connection with the accompanying drawings, wherein is set forth by way of illustration and example, an embodiment and method of practicing this invention.

DESCRIPTION OF THE PREFERRED EMBODIMENT

Figure 1:
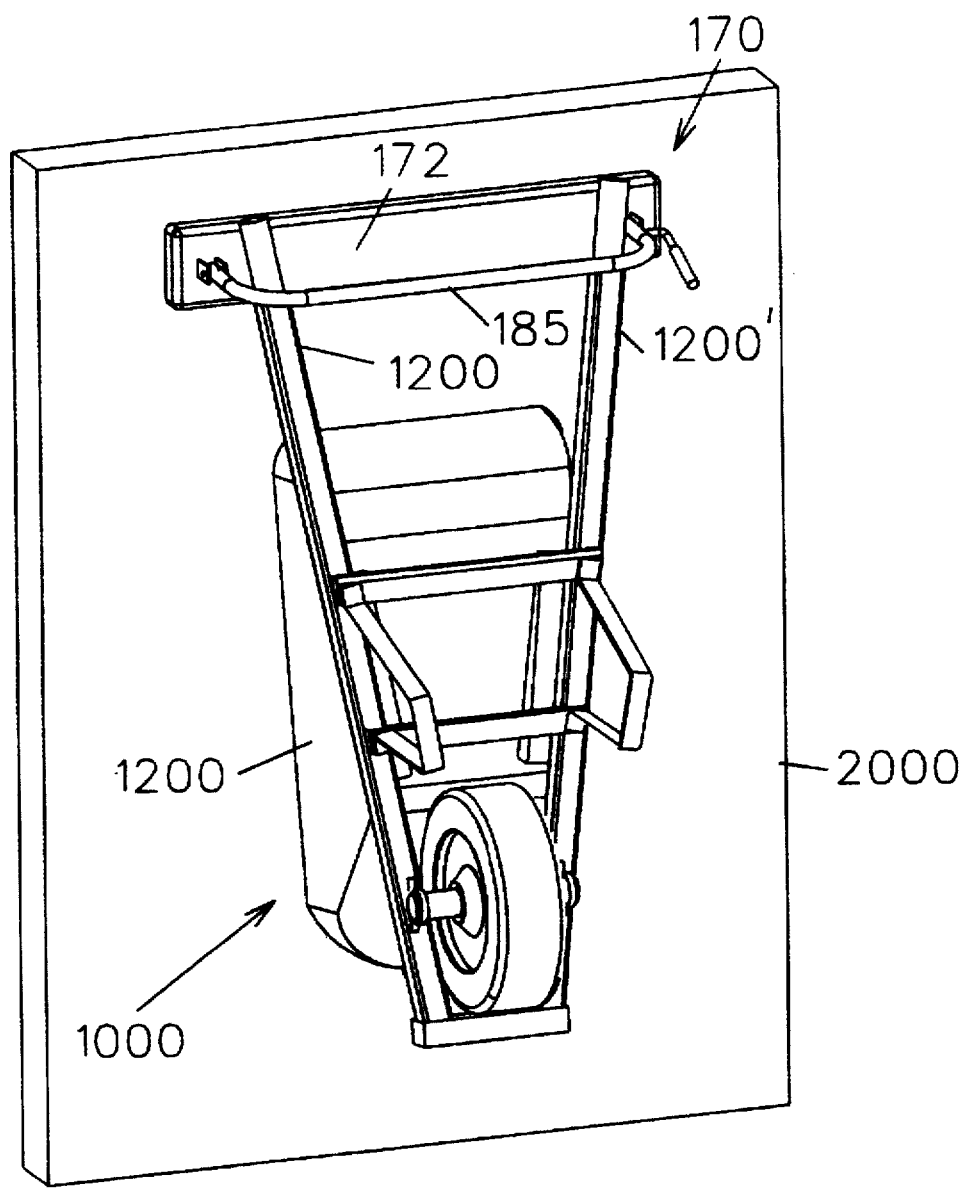
FIG. 1 shows the wheelbarrow rack as attached to a vertical wall with a wheelbarrow maintained in a vertical position therein.
Figure 2:
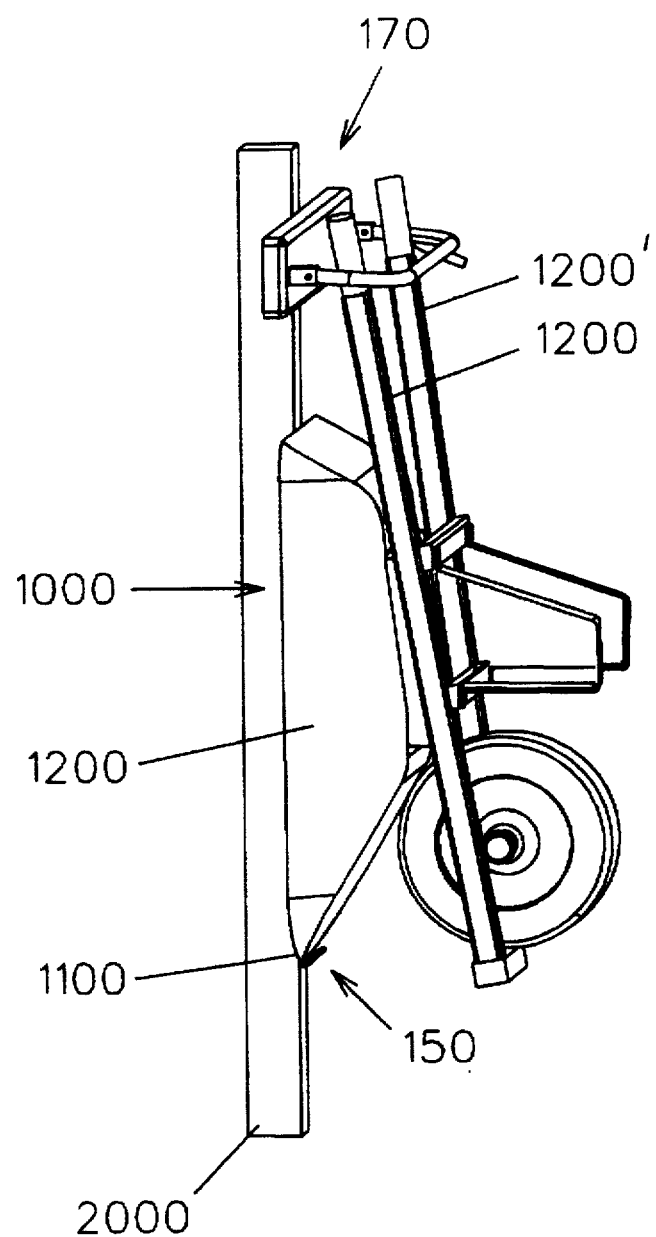
FIG. 2 is a side view of the rack and wheelbarrow stored therein of FIG. 1.
Figure 3:
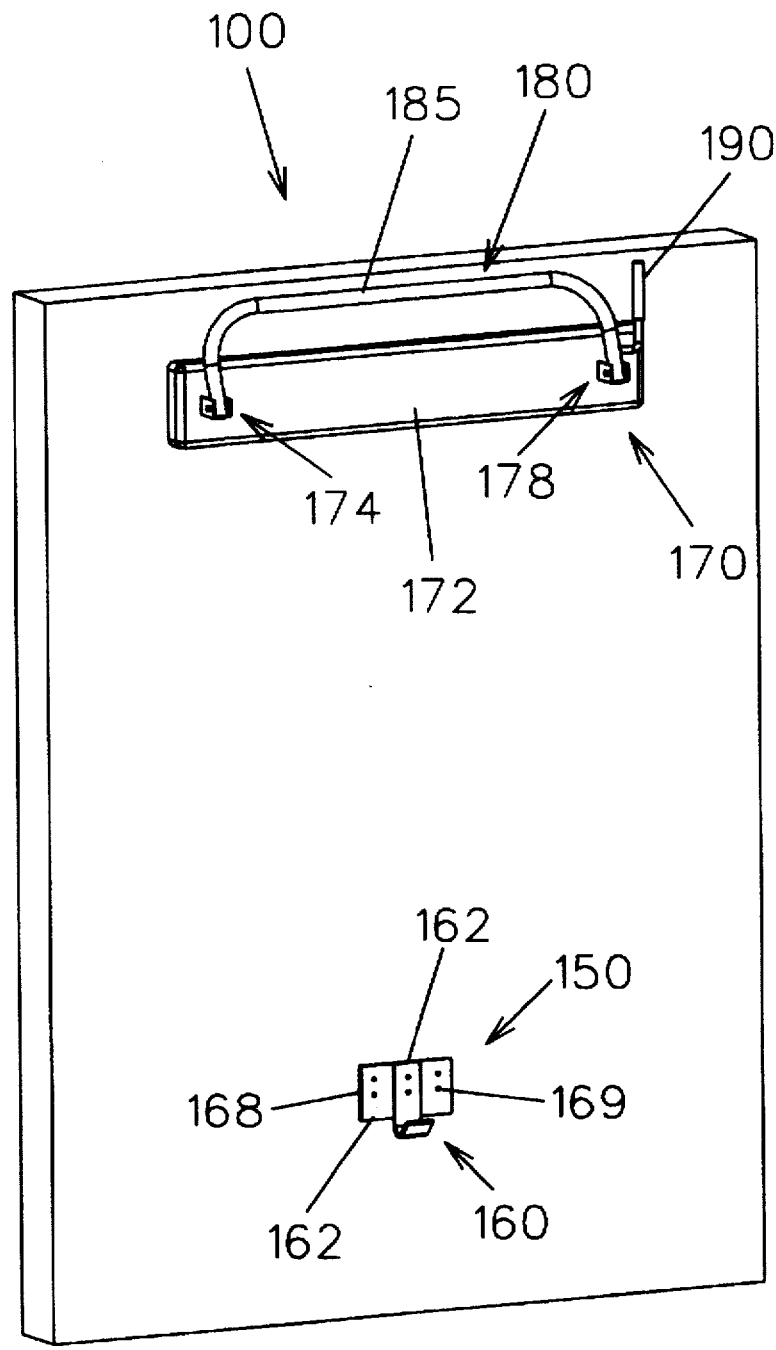
FIG. 3 is a front perspective view of the wheelbarrow rack in an unlocked position.
Figure 5:
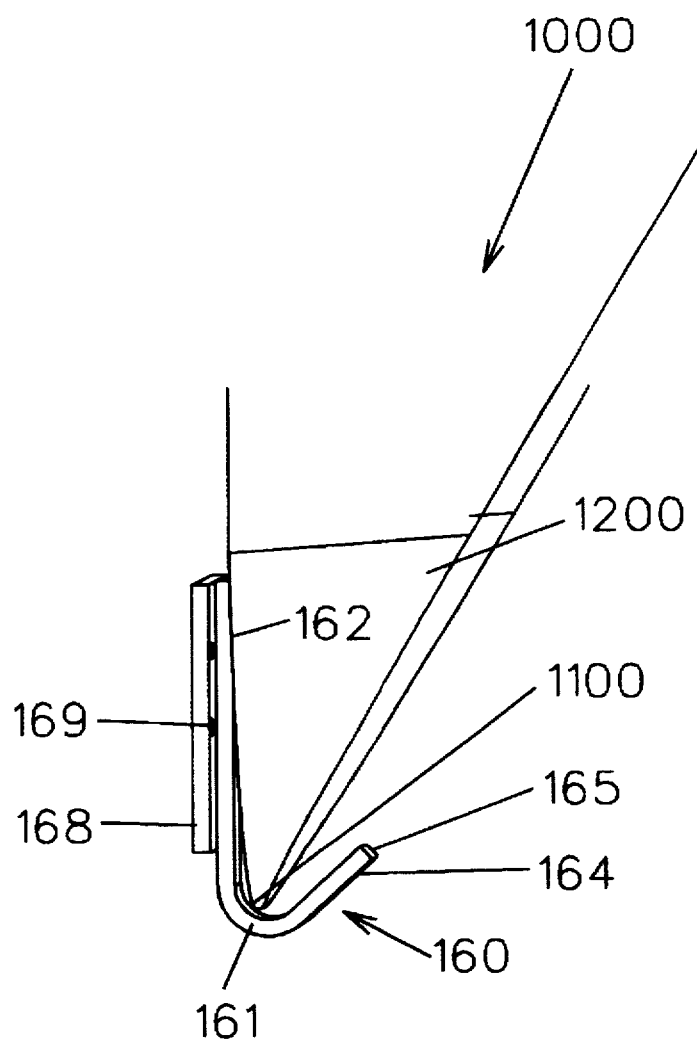
FIG. 5 is a side fragmentary view of the lower plate of the wheelbarrow with a portion of the wheelbarrow diagrammatically shown therein.

Turning more particularly to the drawings, FIG. 3 shows the wheelbarrow rack 100 as comprising a lower support plate assembly 150 and an upper support bar assembly 170. As shown in FIG. 5, the lower support plate assembly 150 comprises a J-hook 160 presenting a generally planar plate 162 with a hook 164 extending from a lower end thereof. The juncture between the plate 162 and hook 164 presents a pivot point/fulcrum for a forward edge/lip 1100 of the pan 1200 of the wheelbarrow 1000 in a manner to be subsequently described. Attached to the plate 162 is a mounting plate 168 having a plurality of apertures 169 therein. Upon extension of fasteners through apertures 169 and into surface 2000, the mounting plate 168 is attached to the vertical surface 2000 such as a wall or the like. The preferable height of the assembly 150 is selected such that the lip 1100 of the wheelbarrow will extend over the free edge 165 of the J-hook 164 when the wheelbarrow is on a horizontal surface adjacent the wall 2000.

Figure 4:
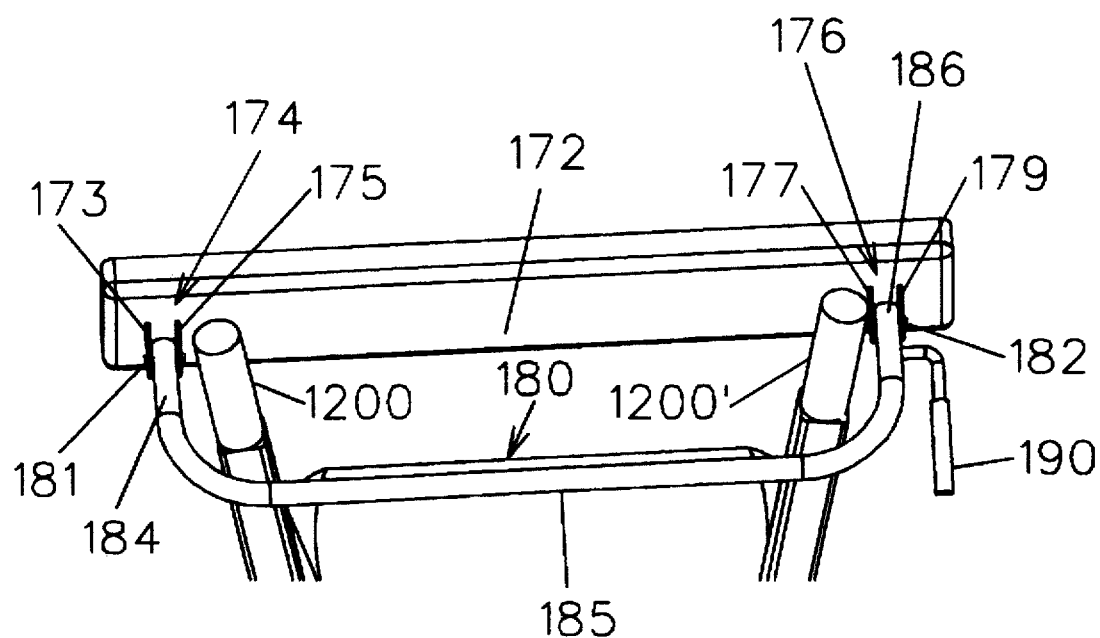
FIG. 4 is a fragmentary perspective view, on an enlarged scale, of the upper bar of the wheelbarrow rack bearing against the wheelbarrow handles.

The upper support bar assembly 170 comprises a mounting plate 172 affixed to the wall 2000. Plate 172 presents a pair of laterally spaced-apart brackets 174, 178 with each bracket 174, 178 presenting a pair of spaced-apart walls 173, 175, 177, 179 extending therefrom. A generally U-shaped bar 180 is pivotally mounted to the brackets 174, 178 by means of a pin 181, 182 extending through the walls of each bracket 174, 178 and through an end 184, 186 of the bar 180. Accordingly, the bar 180 is rotatable between a vertical position, parallel to wall 2000, as shown in FIG. 3 and a horizontal position, normal to wall 2000, as shown in FIG. 4. A handle 190 is attached to one end 186 of the bar 180 for user movement of the bar 180 between the FIG. 3 vertical and FIG. 4 horizontal positions. It is preferred that the ends 184, 186 of the bar 180 be in a friction fit relationship between the bracket walls so that the bar 180 will remain in its vertical FIG. 3 position absent an exertion of forces thereon.

For storage of a wheelbarrow on the storage rack 100 the bar 180 is swung to its vertical FIG. 3 position. The wheelbarrow is then placed adjacent the wall 2000 such that the front edge/lip 1100 of the wheelbarrow pan 1200 extends over the free edge 165 of hook 164. Upon the user lifting the wheelbarrow handles 1200, 1200', the lip 1100 will bear against the juncture 161 between the plate 162 and hook 164 of the lower plate 150. Thus, a fulcrum/pivot point for lip 1100 is presented. A further lifting of the handles 1200, 1200' swings the wheelbarrow about the fulcrum 161 allowing the handles 1200, 1200' to be positioned adjacent the upper mounting plate 172. Once the handles are so positioned, the user grasps the handle 190 and swings the bar 180 from its vertical FIG. 3 position to its horizontal FIG. 4 position. At the latter position the cross strut 185 of bar 180 bears against the handles 1200, 1200'. As positioned, the horizontal bar 180 precludes displacement of the handles 1200, 1200' away from plate 172 and wall 2000. Accordingly, the wheelbarrow is positioned and maintained in a vertical/upright position adjacent wall 2000 with the weight of the wheelbarrow 1000 being primarily supported by the lower plate assembly 150.

To use the wheelbarrow, the user rotates the handle 190 so as to swing the bar 180 to its FIG. 3 vertical/upright position.

The handles 1200, 1200' of the wheelbarrow may now be swung away from the wall 2000', the pivot point being presented by the lip 1100 in the fulcrum 161 until the wheelbarrow rests on the floor adjacent the wall 2000. The wheelbarrow is then rolled away from the wall 2000 for use.

It is again noted that the height of the lower plate assembly 150 above the floor is selected so that the user may easily tip the front edge 1100 of the wheelbarrow pan 1200 so as to engage the lip 1100 within the fulcrum zone 161. Upon initial engagement of the lip 1100 therein the wheelbarrow may then be easily swung from its floor position to its vertical storage position as above described.

It is to be understood that while a certain form of this invention and method of using the same has been illustrated and described, it is not limited thereto except insofar as such limitations are included in the following claims and allowable functional equivalents thereof.

Having thus described the invention, what is claimed as new and desired to be secured by Letters Patent is as follows:

1. A wheelbarrow storage rack for storing a wheelbarrow adjacent a vertical surface comprising:

a first fulcrum member attached to a vertical surface and configured to engage a portion of a lip of a wheelbarrow pan therein;

an upper fastener means attached to the vertical surface above said fulcrum for engagement with handles of a wheelbarrow, said fastener means comprising:
a bar member;
pivot means for mounting said bar member to the vertical surface between a first position with said bar displaced from handles of the wheelbarrow positioned adjacent the vertical surface and a second position with said bar bearing against the handles of a wheelbarrow positioned adjacent the vertical surface, said handles positioned adjacent the vertical surface with a lip of a wheelbarrow pan positioned in said fulcrum member, said second bar position precluding rotation of the wheelbarrow in an opposed direction about the lip in said fulcrum and away from the vertical surface, whereby said fastener means in said second position maintains said wheelbarrow in a position adjacent the vertical surface.

2. The rack as claimed in claim 1 wherein said fulcrum member comprises:

a hook member configured to engage the lip of the wheelbarrow pan therein;

means for attaching said hook member to the vertical surface.

3. The rack as claimed in claim 2 wherein said hook member presents a free edge extending from said wall surface, said hook free edge at a position on said wall and below the lip of the wheelbarrow pan upon positioning said wheelbarrow on a floor adjacent the vertical surface.

4. The rack as claimed in claim 1 wherein said pivot means comprises:

first and second brackets attached to said wall above said fulcrum;

pivot means for attaching first and second opposed ends of said bar member to said respective brackets.

5. The rack as claimed in claim 4 further comprising a handle attached to said bar member, a user manipulation of said handle swinging said bar member between said first and second positions.

6. The rack as claimed in claim 4 wherein said bar comprises:

first and second spaced-apart struts presenting said bar ends attached to said respective brackets;

a cross strut laterally extending between said struts, said cross strut bearing against the wheelbarrow handles in said second bar position.

7. A wheelbarrow wall storage rack comprising:

a lower plate attached to a wall for supporting a portion of a wheelbarrow thereon;

an upper clamp assembly attached to the wall above said plate assembly, said clamp assembly comprising:
a bar having first and second ends;
means for swingably mounting said bar to the wall and between a first position with said bar adjacent the wall and a second position displaced from the wall, said lower plate presenting a pivot point for supporting the portion of a wheelbarrow thereon, a movement of said wheelbarrow about said pivot point positioning a handle of the wheelbarrow adjacent the wall, whereupon a user movement of said bar to said second position positions the handle of the wheelbarrow between the wall and said bar, said bar position precluding movement of the handle away from the wall and of the wheelbarrow about said pivot point, whereby to maintain the wheelbarrow in a position adjacent the wall.

8. The rack as claimed in claim 7 wherein said lower plate comprises:

a hook member configured to engage the portion of the wheelbarrow therein;

means for attaching said hook member to the wall.

9. The rack as claimed in claim 8 wherein said hook member presents a free edge displaced from said wall surface, said hook free edge at a position on said wall and below the portion of the wheelbarrow to be engaged by said hook upon said wheelbarrow being positioned on a floor adjacent the wall.

10. The rack as claimed in claim 7 wherein said pivot means comprises:

at least one bracket attached to said wall above said lower plate;

pivot means for attaching a portion of said bar to said at least one bracket.

11. The rack as claimed in claim 10 further comprising a handle attached to said bar, a user manipulation of said handle swinging said bar member between said first and second positions.

12. The rack as claimed in claim 10 wherein said bar comprises:

at least a first strut presenting said bar portion attached to said respective bracket;

a second strut normal to said at least first strut, said cross strut bearing against said handles in said second position.

13. A method of storing a wheelbarrow along a wall comprising the steps of:

positioning a lower pivot point structure on the wall at a selected distance above an adjacent ground surface;

contacting a portion of the wheelbarrow structure on said pivot point structure;

swinging the wheelbarrow about said pivot point to move handles of the wheelbarrow towards a wall adjacent position until the wheelbarrow is in a generally vertical position with the handles positioned above said pivot pin;

maintaining the handles at said wall adjacent position, the weight of the wheelbarrow being borne by said pivot point, whereby said wheelbarrow extends along the wall.

14. The method as claimed in claim 13 further comprising the steps of:

releasing the maintenance of the handles;

swinging the wheelbarrow about said pivot point and away from the wall until the wheelbarrow is in a ground supported position.

15. The method as claimed in claim 13 wherein said contacting portion of the wheelbarrow is a portion of a forward lip of a pan of the wheelbarrow.

* * * * *

UNITED STATES PATENT AND TRADEMARK OFFICE
CERTIFICATE OF CORRECTION

PATENT NO. :   5,762,210
DATED      :   June 9, 1998
INVENTOR(S) :  Henry W. Dahill It is certified that error appears in the above-identified patent and that said Letters Patent is hereby corrected as shown below:

Column 3, line 53, delete "wall" and substitute --vertical--.

Column 3, line 54, delete "wall" and substitute --vertical surface--.

Column 3, line 60, delete "wall" and substitute --vertical surface--.

Column 4, line 12, delete "assembly".

Column 4, line 23, after the second occurrence of "said" insert --second--.

Column 4, line 35, delete "surface".

Column 4, line 39, delete "pivot" and substitute --mounting--.

Column 4, line 54, delete "handles" and substitute --handle--.

Column 4, line 67, delete "pin" and substitute --point--.

Signed and Sealed this

Thirteenth Day of October 1998

*Attest:*

*Attesting Officer*

BRUCE LEHMAN

*Commissioner of Patents and Trademarks*